Feb. 5, 1946.  E. ROTH  2,394,485
ROLLER DRIVE FOR ROLLER MILLS
Filed Dec. 8, 1943
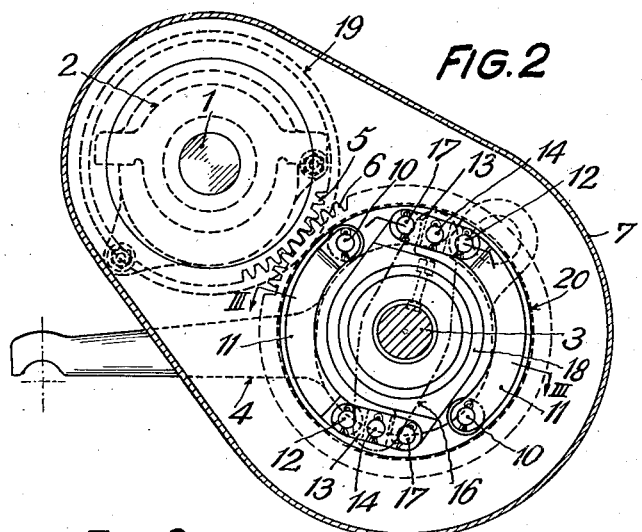
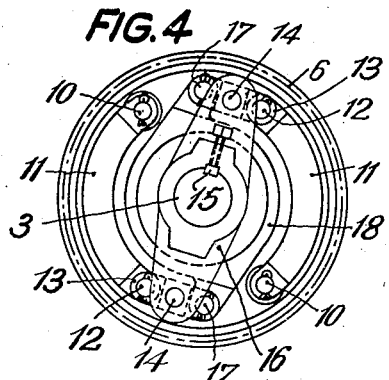
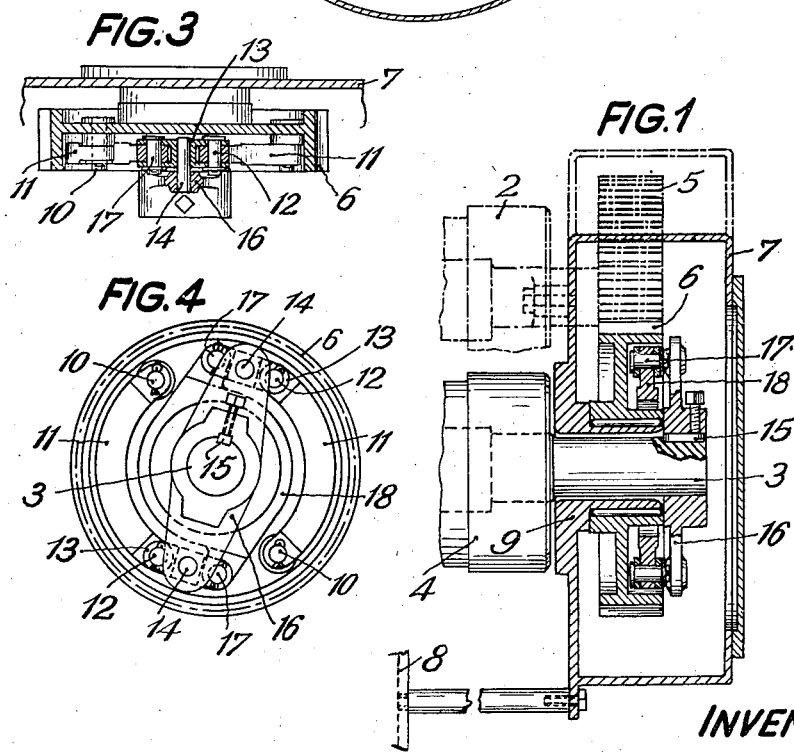
INVENTOR:
Ernst Roth
by Sommers + Young
Attorneys Patented Feb. 5, 1946

2,394,485

UNITED STATES PATENT OFFICE 2,394,485

ROLLER DRIVE FOR ROLLER MILLS

Ernst Roth, Niederuzwil, Switzerland, assignor to Gebruder Buhler, Uzwil, Switzerland Application December 8, 1943, Serial No. 513,440
In Switzerland August 11, 1942

2 Claims. (Cl. 74—397)

The present invention relates to a roller drive for roller mills in which a gear wheel mounted on the axis of the stationary roller meshes with a gear wheel associated with the adjustable roller, this latter gear wheel being mounted on a stationary hollow journal pin and coupled with the adjustable roller. Such an arrangement of a roller drive provides that upon a movement of the adjustable grinding roller the engagement of the gear wheels does not vary. In known drives of this type the coupling of the gear wheel mounted on the stationary hollow pin with the adjustable roller is effected by means of a pin fixed eccentrically in one of the parts to be coupled and engaging a longitudinal slot of the other part, whereby the adjustable roller can be displaced while conserving the correct mesh of the two gears. However, the eccentric pin does not exert a pure torque on the movable roller, but a variable pressure, so that the grinding pressure on the side of the drive of the roller is not equal to that on the opposite side of the roller. Accordingly, it is not possible to obtain a uniform grinding effect with the mentioned known arrangements.

This inconvenience is avoided by the roller drive for roller mills according to the present invention in that the coupling of the gear wheel associated with the adjustable roller axis with the adjustable roller is so formed that a pure torque is exerted on the adjustable roller, so that upon a uniform feed motion being imparted to the adjustable roller, the grinding pressures on the driving side of the roller and on the opposite side remain equal. Conveniently a positive lever system connected with the gear wheel mounted on the hollow journal pin attacks on two diametrically opposed points of a driver fixed on the axis of the movable roller.

The accompanying drawing represents by way of example an embodiment of the present invention.

Fig. 1 is a sectional view of the drive of the movable roller;

Fig. 2 shows a front view of the device with a sectioned wheel casing and dismantled driver;

Fig. 3 is a section according to the line III—III of Fig. 2, and

Fig. 4 shows a fragmentary view of Fig. 2.

The axis 1 of one roller 19 is mounted in a stationary bearing 2 and the axis 3 of the other roller 20 in a movable bearing 4. The gear wheel 5 placed on the fixed roller axis 1 cooperates with the gear wheel 6 which serves for the drive of the adjustable roller 20.

The gear casing 7 is rigidly connected with the stationary bearing 2 on the one hand and with the machine standard 8 on the other hand and carries a hollow journal pin 9 surrounding the adjustable roller axis 3, the bore of which is greater than the diameter of the roller axis 3 to allow for the release stroke of the roller and to take up wear of the rollers.

The gear wheel 6 is rotatably mounted on the stationary hollow journal pin 9 and carries at two diametrically opposed points two bolts 10 to which are attached with one of their ends links 11; the other end of each link 11 being hingedly connected to one fork-shaped end of a small double-armed lever 13. The journals 14 of the two levers 13 are carried by arms of a driver 16 the hub of which is rigidly connected by a key 15 to the roller axis 3. The other fork-shaped ends of the levers 13 are connected by means of bolts 17 with a ring 18. In this manner a positive movable coupling is formed between the gear wheel 6 and the roller axis 3, and any modification of the distance between the axes of the stationary and the adjustable rollers is without effect on the mesh of the gears. Further, only a single pair of forces acts upon the roller axis 3, which accordingly is subjected to a pure torque, but to no gear pressure, so that upon any uniform adjustment of the movable roller the grinding pressures on the driving side of the roller and on the opposed side remain equal.

I claim:

1. In a roller drive for roller mills having co-operating stationary and adjustable rollers mounted on rotatable axes, a gear wheel mounted on the axis of the stationary rollers, a stationary hollow journal pin traversed by the axis of the adjustable roller, a gear wheel loosely mounted on said journal pin and meshing with said first mentioned gear wheel, a driver mounted for rotation with the axis of the adjustable roller, a ring loosely surrounding the axis of the journal pin, levers pivoted intermediately of their ends to opposite points on the driver, one end of each of said levers being pivoted to said ring, and links connecting the gear wheel on said journal pin with two diametrically opposed points of said driver so as to exert a pure driving torque on the driver.

2. In a roller drive for roller mills having co-operating stationary and adjustable rollers mounted on rotatable axes, a gear wheel mounted on the axis of the stationary roller, a stationary hollow journal pin traversed by the axis of the adjustable roller, a gear wheel loosely mounted on said journal pin and meshing with said gear wheel on the axis of the stationary roller, a driver mounted for rotation with the axis of the stationary roller, two journal pins carried by said driver on diametrically opposed points thereof, a double armed lever mounted on each of said two journal pins, two link rods each having one end hingedly connected to the gear wheel mounted on said hollow stationary journal pin and the other end to one end of each of said double armed levers, and a member movable relatively to the gear and journal for positively connecting with each other the other ends of said two double armed levers.

ERNST ROTH.